(12) United States Patent  
Bettaieb

(10) Patent No.: US 6,760,363 B1  
(45) Date of Patent: Jul. 6, 2004

(54) DIGITAL CORRELATION DEVICE AND CORRELATION METHOD FOR TELEMETRIC SYSTEMS

(75) Inventor: Khaled Bettaieb, Hauterive (CH)

(73) Assignee: CSEM Centre Suisse d'Electronique et de Microtechnique SA, Neuchatel (CH)

( * ) Notice: Subject to any disclaimer, the term of this patent is extended or adjusted under 35 U.S.C. 154(b) by 743 days.

(21) Appl. No.: 09/655,715

(22) Filed: Sep. 5, 2000

(30) Foreign Application Priority Data

Sep. 6, 1999 (EP) .......................................... 99117551

(51) Int. Cl.[7] ........................... G01S 13/28; G01S 13/08
(52) U.S. Cl. ..................................... 375/150; 375/343
(58) Field of Search ................................ 375/146, 147, 375/149, 150, 142, 137, 343; 342/202, 195, 149, 150

(56) References Cited

U.S. PATENT DOCUMENTS 5,321,409 A  6/1994 Walker ........................ 342/202

5,414,729 A  5/1995 Fenton ........................ 375/209

OTHER PUBLICATIONS

National Telesystems Conference, U.S., New York, I.E.E.E., vol. Conf. 1983, 1983, pp. 214–218, XP002100664, "A GPS Fast Acquisition Receiver" by Eric D. Holm et al.

Primary Examiner—Emmanuel Bayard  
Assistant Examiner—Dung X. Nguyen  
(74) Attorney, Agent, or Firm—Griffin & Szipl, P.C.

(57) ABSTRACT

A correlation method and a digital correlation device allowing detection of the occurrence of a coded reference sequence including N code elements or chips in a sampled reception signal are described. The reception signal is sampled at a frequency equal to d times the chip rate of the reference sequence, and d×Nd correlation values are generated for d×Nd successive delays of the reception signal, Nd being a lower number than the number N of chips. Each correlation value, for a given delay of the reception signal, is obtained, according to the present invention, at the end of a plurality of correlation operations during which partial correlation values covering code portions including Nd successive chips of the reference sequence are generated.

6 Claims, 2 Drawing Sheets

DIGITAL CORRELATION DEVICE AND CORRELATION METHOD FOR TELEMETRIC SYSTEMS

FIELD OF THE INVENTION

The present invention concerns the field of telemetric systems, in particular systems for measuring distances. More particularly, the present invention relates to a digital correlation device, used in such telemetric systems, which allow the occurrence of a coded reference sequence to be detected in a sampled reception signal, such occurrence allowing, in particular, the distance from a target to be determined. The present invention also concerns a correlation method.

BACKGROUND OF THE INVENTION

Telemetric distance measuring systems based on signal compression usually include means for transmitting a modulated signal by means of a coded reference sequence, a first antenna adapted to direct the power from the signal towards a target, a second antenna adapted to receive the power reflected by the target, and a correlation device determining the amount of delay which occurs on the reception signal and thus the distance of the target. More specifically, this delay is determined by correlating the coded reference sequence with the reception signal for a set of delays thereof. The presence of a correlation peak among the correlation values calculated allows the delay corresponding to the distance of the target to be identified.

The signal modulation technique typically used in such telemetric systems is called spread spectrum modulation. This modulation technique consists in spreading the bandwidth of the signal in order, in particular, to minimise the sensitivity of the latter to white noise or jamming, and finds application in various fields such as telemetry, radar systems or telecommunications. In particular, this modulation technique is applied to telemetric systems, such as the distance measuring systems to which the invention relates.

Various spread spectrum modulation techniques are known to those skilled in the art. In particular, a technique consisting in modulating the signal transmitted towards the target by means of a coded pseudo-random sequence is known by the name of direct sequence spread spectrum modulation or pseudo-noise spread spectrum modulation. The present invention essentially concerns this type of modulation technique.

The use of pseudo-random sequences in telemetric applications has mainly been applied to long distance telemetry. Examples of these applications are for example the GPS system or atmospheric analysis systems. This is explained mainly by the fact that the resolution of such systems, in terms of distance, is directly linked to the sampling frequency of the reception signal. For short distance applications, higher resolutions are necessary and, consequently, higher sampling frequencies requiring a very rapid hardware system implementation.

The digital correlators currently available on the market have limitations both in terms of correlation speed and code length. In particular, in order to implement such a telemetric distance measuring system, the correlators must have a complementary parallel peak detection function able to detect the correlation values for different delays of the reception signal. This function is generally achieved by means of specific circuits which, however, cannot operate at the speed required for short distance applications.

It is also possible to use a serial peak detector, also called a sliding correlator, but the acquisition time of this system, i.e. the time necessary to find the correlation peak, is much too long and thus makes the use of such a peak detector unsuitable for distance measuring applications.

One object of the present invention is thus to propose a digital correlation device able to operate at the high correlation speeds required for short distance applications.

Another object of the present invention is to propose a digital device whose architecture is substantially independent of the code length of the reference sequence used for correlation.

SUMMARY OF THE INVENTION

The invention therefore concerns a digital correlation device allowing detection of the occurrence of a coded reference sequence including N code elements or chips in a sampled reception signal, this device including the following features: (1) first and second registers for respectively loading successive samples of the reception signal and chips of the coded reference sequence, and (2) calculating means delays of the reception signal, wherein (3) the reception signal is sampled a frequency equal to d times the chip rate of the reference sequence; (4) the device is arranged to generate d×Nd correlation values corresponding to d×Nd successive delays of the reception signal, Nd being a lower number than the number N of chips of the reference sequence, each correlation value, for a given delay of the reception signal, being obtained at the end of a determined number of partial correlation operations during which the calculating means generate a partial correlation value covering code portions including Nd successive chips of the reference sequence; and (5) the device further includes accumulation means, coupled to the calculating means, and including d×Nd memory sections each allowing the partial correlation value generated for a given delay of the reception signal to be accumulated during each partial correlation operation.

Variants of this digital correlation device are the subject of the-dependent claims.

The present invention also concerns a novel correlation method allowing detection of the occurrence of a coded reference signal including N code elements or chips in a sampled reception signal, this method generating correlation values for a set of successive delays of the reception signal, wherein: the reception signal is sampled at a frequency equal to d times the chip rate of the reference sequence; and d×Nd correlation values are generated for d×Nd successive delays of the reception signal, Nd being a lower number than the number N of chips of the reference sequence; this method including the steps of: (a) selecting a code portion covering the Nd first successive chips of the reference sequence; (b) selecting a set of samples of the reception signal corresponding to the first delay; (c) calculating a partial correlation value between the selected code portion and the selected samples of the reception signal; (d) accumulating the calculated partial correlation value; (e) selecting a set of samples of the reception signal corresponding to the next delay; (f) repeating steps (c) to (e) until a partial correlation value has been calculated and accumulated for the d×Nd delays of the reception signal; (g) selecting a code portion covering Nd successive chips of the reference sequence directly following the previously selected code potion; and (h) repeating steps (b) to (g) until the selected code portion covers the Nd last successive chips of the reference sequence.

One advantage of the correlation device according to the present invention lies in the fact that its architecture, which is simple to realise, allows it to be used at higher sampling frequencies than previously possible with the correlation devices of the prior art, and thus its use is perfectly suited to short distance telemetric systems.

This simple architecture further allows the cost of the correlation device to be substantially reduced and, thereby, the cost of the telemetric system in which it is used.

BRIEF DESCRIPTION OF THE DRAWINGS

Other advantages and peculiarities of the invention will be explained in more detail in light of the following description, with reference to the annexed drawings hereinafter, which are given purely by way of illustrative and non-limiting example, in which.

DETAILED DESCRIPTION OF THE PREFERRED EMBODIMENTS

The correlation device which is the subject of the present invention takes the schematic form of a parallel correlator adapted to correlate a sampled reception signal with a coded reference sequence including N code elements, also called "chips". Expressed in mathematical form, this correlation device performs the following correlation function:

$$\sum_{i=1}^{N} r_i C_i \quad (1)$$

where $r_i$ designates a reception signal sample and $c_i$ represents a chip of the reference sequence.

Figure 1:
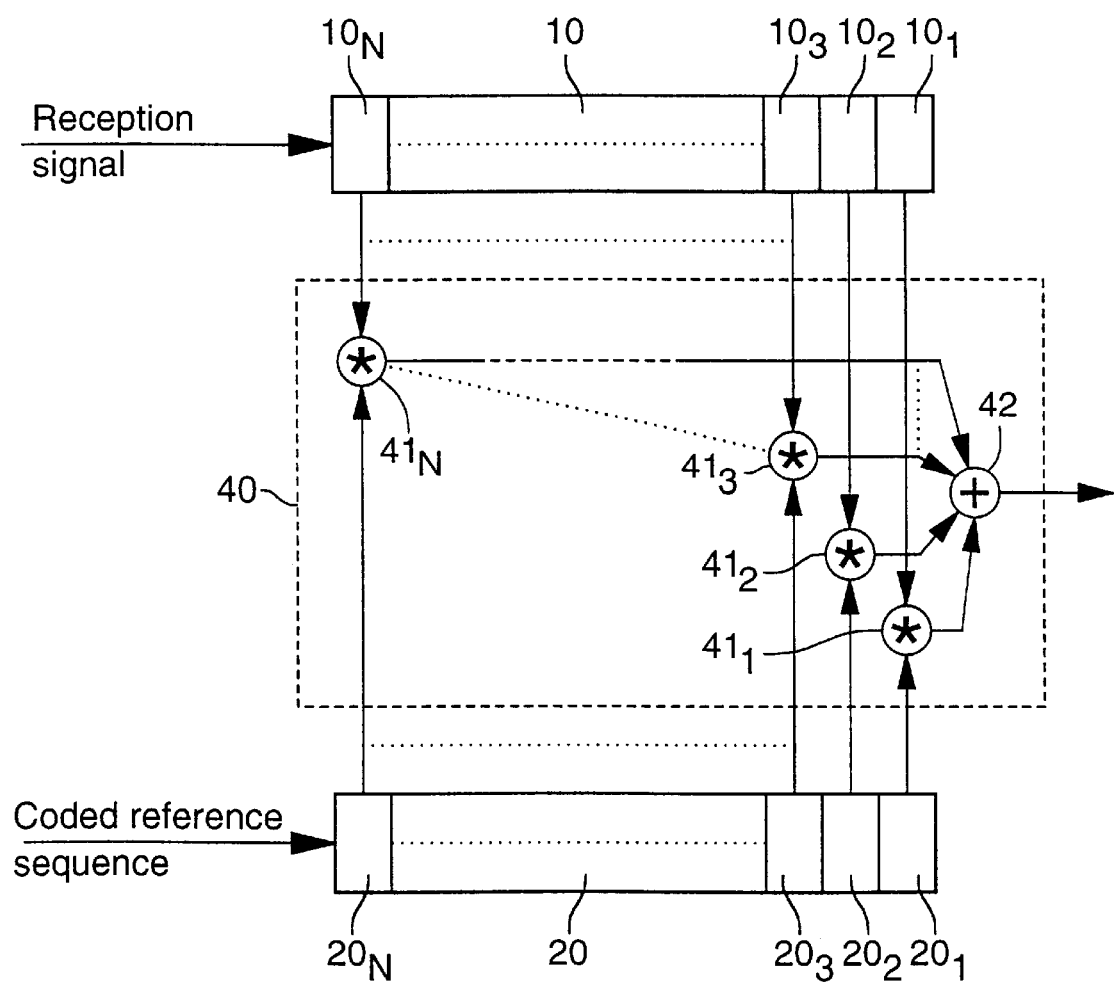
FIG. 1 shows a schematic example of a direct implementation of a parallel digital correlator allowing a sampled reception signal to be correlated with a coded reference sequence.

FIG. 1 shows a schematic example of a direct implementation of such a correlation device. This device thus includes first and second registers, indicated by the numerical references 10 and 20, respectively intended to receive samples of the reception signal and chips of the coded reference sequence with which the reception signal has to be correlated. These registers include, in this schematic example, a number of cells equal to the number of chips of the coded reference sequence, namely N chips. These cells are respectively indicated by the numerical references $10_1$ to $10_N$ and $20_1$ to $20_N$.

This correlation device further includes calculating means 40 coupled to first and second registers 10 and 20 in order to produce the correlation function expressed at (1) above. These calculating means 40 thus include, in this direct implementation, N multipliers $41_1$ to $41_N$ each coupled to a cell of first register 10 and a corresponding cell of second register 20, as well as an adder 42 with N inputs coupled to the outputs of N multipliers $41_1$ to $41_N$. As will easily be understood, the adder provides, at its output, a correlation value defined by the mathematical expression (1) above.

It will easily be understood that this direct implementation requires significant hardware resources which are proportional to length N of the coded reference sequence. Adder 42 which includes a significant number of inputs, in particular constitutes the most limiting element in terms of speed. The solution provided by the present invention will especially allow this problem to be solved.

According to the present invention, in order to increase the resolution of the telemetric system, the sampling frequency of the reception signal is fixed at a multiple of the chip rate of the coded reference sequence. This means that the mathematical expression (1) of the correlation function then becomes:

$$\sum_{j=1}^{N} \left( \sum_{i=(j-1)d+1}^{jd} r_i \right) C_j \quad (2)$$

where d designates the multiplication factor of the reception signal sampling frequency with respect to the chip rate of the reference sequence.

It will be noted also that by fixing a maximum measuring distance of the telemetric system, only a limited number of correlation values is determining in order to allow detection of a correlation peak. Indeed, for a maximum determined measuring distance, the correlation peak will only appear, in extreme circumstances, after a maximum delay corresponding to this maximum measuring distance.

Let us take by way of example a telemetric system using a laser pulse-modulated at a chip rate of 20 MHz and a maximum measuring distance of 200 meters, the number of relevant delays, expressed in chips, amounts to Nd=27. Assuming a sampling frequency d times higher than the chip rate, this means that only d×Nd correlation values have to be calculated, i.e. the correlation values for d×Nd successive delays of the reception signal. It will be noted that the number Nd of relevant delays expressed in chips is defined as being less than the total number N of chips forming the coded reference sequence.

It is to be noted that the fact of fixing a maximum measuring distance of the telemetric system in no way limits the range thereof. Indeed, one may perfectly well envisage considering, not the d×Nd first delays of the reception signal, but the d×Nd successive delays of the signal considered from a determined fixed delay. It will thus be possible to effect measurements over a given distance, for example 200 meters, beyond a determined fixed distance.

Generally, the correlation device according to the present invention is arranged to generate correlation values corresponding to d×Nd successive delays of the reception signal. These correlation values are generated in several correlation operations, called partial correlation operations, during which the reception signal is correlated with code portions including Nd successive chips of the reference sequence. In other words, the correlation operation is broken down into a plurality of partial correlation operations covering only portions of the coded reference sequence. As will be seen in more detail in the following part of the present description, this solution allows the hardware resources required to calculate the correlation function to be greatly limited, i.e. in particular the number of multipliers as well as the number of adder inputs.

The operating principle of the correlation device according to the present invention is thus as follows. For each of the d×Nd delays of the reception signal, the correlation device according to the present invention generates, during a first partial correlation operation, a first correlation value, called partial correlation value, covering the Nd first chips of the reference sequence. This first partial correlation value is accumulated to be subsequently added to the next partial correlation value generated for each corresponding delay.

During a second partial correlation operation, a second partial correlation value, covering the following Nd chips is generated in a similar manner, for each delay of the reception signal, then added to the first corresponding correlation value which had been accumulated during the preceding sequence.

A plurality of partial correlation operations thus follow in order to generate, at the end of a determined number of operations, the total correlation value for each of the d×Nd successive delays considered.

The number of these operations depends on the number N of chips of the reference sequence as well as the number Nd of relevant delays expressed in chips. More specifically, the number of partial correlation operations to be executed is equal to the ratio Icm(N,Nd)/Nd, where Icm(N,Nd) designates the least common multiple of numbers N and Nd.

Moreover, the portions of successive Nd chips selected to calculate the partial correlation values begin with the portion covering the first Nd chips of the reference sequence and end with the portion covering the last Nd chips of said sequence. Each chip of the reference sequence is thus correlated with the reception signal an equal number of times to the ratio Icm(N,Nd)/N.

By way of example, if the number N of chips forming the reference sequence can be evenly divided by the number Nd of relevant delays, expressed in chips, N/Nd partial correlation operations will have to be performed to reach the total correlation value covering the complete reference sequence. In this case, each chip of the reference sequence is only correlated once with the reception signal.

Conversely, if the coded reference sequence includes a prime number of chips, i.e. a number N which cannot be evenly divided by Nd, N partial correlation operations will have to be performed to reach a total correlation value. In such case, each chip of the reference sequence is correlated Nd times with the reception signal, and the total correlation values obtained are multiples (Nd times) of the correlation values covering the complete reference sequence. In other words, the equivalent of Nd correlation operations covering the complete reference sequence will have been performed.

An embodiment of a correlation device according to the present invention which allows the aforementioned functions to be fulfilled will now be described with reference to FIG. 2. This Figure thus shows schematically a correlation device, generally indicated by the numerical reference 1, including first and second registers 10 and 20 respectively intended to load samples of the reception signal and chips of the reference sequence. According to this embodiment, correlation device 1 further includes a summing filter 30 arranged at the input of first register 10 and allowing the sampled reception signal to be pre-processed before being loaded in first register 10. Correlation device 1 further includes calculating means 40, coupled to first and second registers 10 and 20, to generate correlation values between the coded reference sequence and the reception signal, as well as accumulation means 50 allowing the correlation values corresponding to d×Nd successive delays of the reception signal to be accumulated.

More specifically, according to this embodiment, first register 10 includes d×Nd cells indicated generically by the numerical references $10_a$, the index a taking values 1 to d×Nd, and second register 20 includes Nd cells indicated generically by the numerical references $20_b$, the index b taking the values 1 to Nd. Numerical references $10_1$ and $20_1$ thus indicate, for example, the first cells of, respectively, first and second registers 10 and 20.

The purpose of summing filter 30, arranged at the input of first register 10, is to pre-process the samples of the reception signal so that the latter can be correlated with the codes elements of the reference sequence. Indeed, as the reception signal is sampled at a frequency d times greater than the chip rate of the reference sequence, the successive samples of the reception signal have to be summed over a period corresponding to the period of one chip, i.e. adding d successive samples of the reception signal. This summing filter 30 may be made in the form of a register including d cells, indicated in FIG. 2 by the references $31_1$ to $31_d$, and an adder 32 with d inputs respectively connected to cells $31_1$ to $31_d$.

Figure 2:
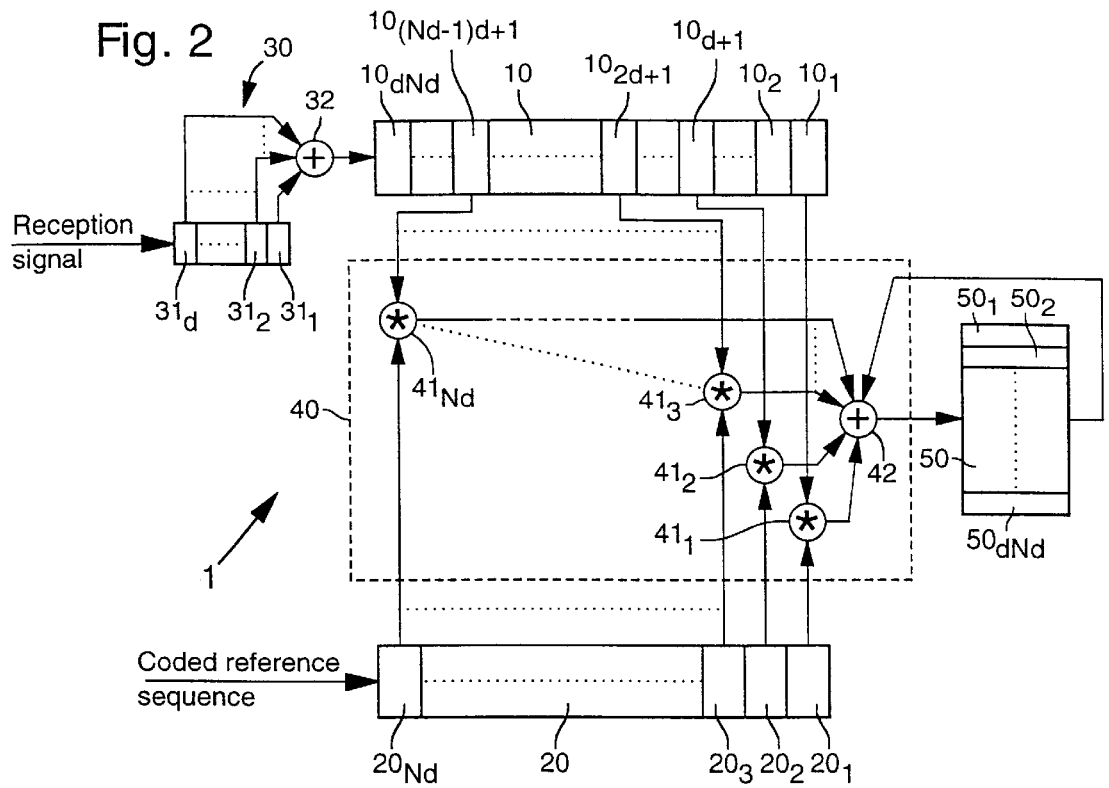
FIG. 2 shows a first embodiment of a digital correlation device according to the present invention.

In the example of FIG. 2, summing filter 30 thus allows first register 10 to be loaded with elements, hereinafter called "signal elements", formed of the sum of d successive samples of the reception signal.

Initially, i.e. for the first delay of the reception signal, or "delay zero", first register 10 is thus loaded with d×Nd signal elements formed from the following sums:

$$\sum_{i=k}^{k+d-1} r_i \tag{3}$$

where the index k represents the index of the cell in first register 10 and takes the values 1 to d×Nd.

More specifically, it will be noted that the Nd cells of first register 10, taken from first cell $10_1$, with a periodicity of d cells, namely, cells $10_1$, $10_{d+1}$, $10_{2d+1}$, ..., $10_{(Nd-1)d+1}$ initially contain, for delay zero of the reception signal, the following sums, whose formulation is derived from mathematical expression (3) above:

$$\sum_{i=(j-1)d+1}^{jd} r_i \tag{4}$$

where index j takes the values 1 to Nd.

For delay zero, first cell $10_1$ thus initially contains the signal element formed of the sum of samples $r_1$ to $r_d$, cell $10_{d+1}$, the signal element formed of the sum of samples $r_{d+1}$ to $r_{2d}$, and so on until cell $10_{(Nd-1)d+1}$ which contains the signal element formed of the sum of samples $r_{(Nd-1)d+1}$ to $r_{dNd}$.

In other words, cells $10_1$, $10_{d+1}$, $10_{2d+1}$..., $10_{(Nd-1)d+1}$ of first register 10 initially contain the Nd signal elements covering the d×Nd first successive samples of the reception signal necessary to calculate the first partial correlation value for delay zero.

By performing a one cell shift in first register 10, these same cells will contain the Nd successive signal elements necessary to calculate the partial correlation value for the following delay. After d×Nd shifts in first register 10, these cells will then contain the Nd successive signal elements necessary to calculate the second partial correlation value for delay zero.

Calculating means 40 include Nd multipliers indicated by the numerical references $41_1$ to $41_{Nd}$. These multipliers are respectively coupled, on the one hand, to Nd cells $10_1$, $10_{d+1}$, $10_{2d+1}$, ..., $10_{(Nd-1)d+1}$ of first register 10, and, on the other hand, to cells $20_1$ to $20_{Nd}$ of second register 20.

Calculating means 40 further include an adder 42 allowing, on the one hand, the outputs of the Nd multipliers $41_1$ to $41_{Nd}$ to be summed and thus a partial correlation value to be formed between Nd chips of the reference sequence loaded in second register 20 and Nd signal elements covering d×Nd successive samples of the reception signal loaded in first register 10. Adder 42 allows, on the other hand, the partial correlation value thereby generated to be accumulated with a partial correlation value previously stored in accumulation means 50. This adder 42 thus includes Nd+1 inputs, Nd of them being connected to the outputs of multipliers $41_1$ to $41_{Nd}$ while the last is connected to the output of accumulation means 50.

Accumulation means 50 is arranged at the output of adder 42 and allows the partial correlation values corresponding to d×Nd successive delays of the reception signal to be stored and accumulated. This accumulation means 50 thus includes d×Nd distinct memory sections, indicated by the numerical references $50_1$ to $50_{dNd}$ intended to accumulate the partial correlation values successively generated by calculating means 40 during each partial correlation operation. Each of the memory sections is addressed in turn as a function of the delay of the reception signal considered, and a new correlation value formed of the addition of the preceding partial correlation value and the partial correlation value generated by calculating means 40 is accumulated in this memory section.

Accumulation means 50 is preferably a RAM (Random Access Memory), but may alternatively be any other similar storing means suited to perform the function which is described in the present description.

Figure 3:
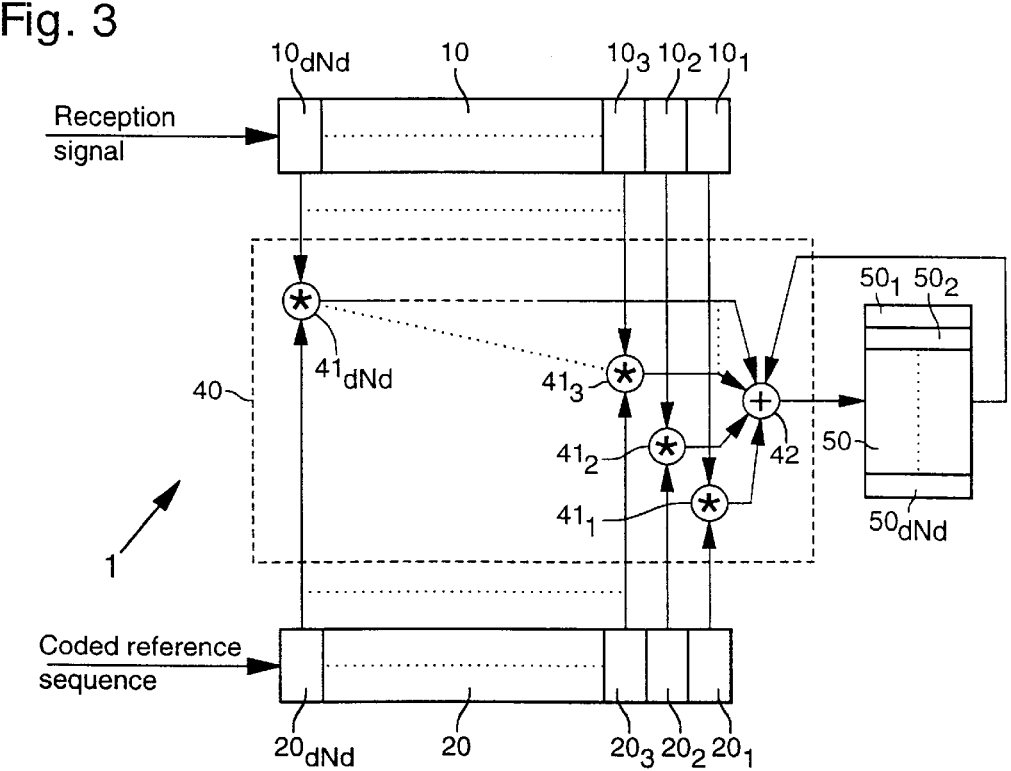
FIG. 3 shows another embodiment of a digital correlation device according to the present invention.

FIG. 3 shows an alternative of the correlation device illustrated in FIG. 2. Identical numerical references have been used to indicate the elements common to this device and to the first embodiment of FIG. 2.

The correlation device of FIG. 3 does not include summing filter 30. In this embodiment, the samples of the reception signal are directly loaded into first register 10. Second register 20 includes in this case a higher number of cells to load Nd successive chips of the reference sequence. This second register includes here d×Nd cells, indicated by the numerical references $20_1$ to $20_{dNd}$, each of the Nd loaded chips being repeated in d successive cells of second register 20.

Moreover, the calculating means include d×Nd multipliers, indicated by the numerical references $41_1$ to $41_{dNd}$, coupled, on the one hand, to d×Nd cells $10_1$ to $10_{dNd}$ of first register 10 and, on the other hand, to d×Nd cells $20_1$ to $20_{dNd}$ of second register 20. Consequently, adder 42 includes here d×Nd+1 inputs, d×Nd of which are connected to the outputs of multipliers $41_1$ to $41_{dNd}$.

It will thus be noted that this alternative uses more hardware resources but nonetheless fulfils an entirely similar function to that of the device illustrated in FIG. 2, namely it generates correlation values corresponding to d×Nd successive delays of the reception signal, these correlation values being generated in several partial correlation operations during which the reception signal is correlated with portions of Nd successive chips of the reference sequence.

With reference again to FIG. 2, the sequence of operations allowing the correlation values covering the N chips of the reference sequence to be generated by means of the correlation device according to the present invention will now be described in detail.

By way of illustration, it will be assumed that the reference sequence includes N=1023 chips, that the chip rate of the reference sequence is 20 MHz and that the sampling frequency is 80 MHz, namely d=4 times higher than the chip rate.

It will also be assumed that the maximum measuring distance of the system is fixed at 200 meters, so that Nd=27 delays, expressed in chips, have to be examined, i.e. d×Nd= 108 delays in terms of sampling periods.

The digital correlation device illustrated in FIG. 2 includes a first register (10) with 108 cells, a second register (20) with 27 cells, a summing filter (30) with 4 cells, 27 multipliers ($41_1$ to $41_{27}$), an adder (42) with 28 inputs, and accumulation means including 108 memory sections ($50_1$ to $50_{108}$) each arranged to store one of the 108 correlation values generated. The multipliers are coupled, on the one hand, to cells $10_1$, $10_5$, $10_9$, ..., $10_{105}$ of the first register and, on the other hand, to cells $20_1$ to $20_{27}$ of the second register.

The number of partial correlation operations to be performed amounts, in this example, to 341 operations at the end of which each chip of the reference sequence will have been correlated 9 times with the reception signal.

The sequence of operations is thus broken down, in this example, into 341 partial correlation operations during which the reception signal is correlated with code portions including Nd=27 successive chips of the reference sequence.

During the first correlation operation, first register 10 is initially loaded with 108 signal elements formed of the sums of four successive samples of the reception signal. Second register 20 is loaded with the 27 first chips of the reference sequence.

Calculating means 40 then generate a first partial correlation value for delay zero, and this partial correlation value is accumulated in the first memory section 50$_1$ of accumulation means 50.

A one cell shift is then performed in first register 10 in order for the signal elements corresponding to the following delay to be presented to the inputs of multipliers $41_1$ to $41_{27}$. Calculating means 40 then generate a first partial correlation value for the following delay and this partial correlation value is accumulated in second memory section $50_2$ of accumulation means 50.

Successive shifts of first register 10 are then made at each sampling period in order to cover all the 108 delays examined. After 108 shifts of first register 10, accumulation means 50 will have accumulated a first partial correlation value for each of the 108 delays, and cells $10_1$, $10_5$, $10_9$, ..., $10_{105}$ of first register 10 will contain the 27 following signal elements corresponding to delay zero.

It is at this moment that the second partial correlation operation actually starts. Second register 20 is then loaded with the following 27 chips of the reference sequence. A second partial correlation value is thus calculated, for each delay, in a similar manner to that which was described previously, and accumulated with the first partial correlation value which is already stored in accumulation means 50.

The partial correlation operations follow each other until the 341st partial correlation operation during which second register 20 contains the last 27 chips of the reference sequence. A last partial correlation value is thus calculated, for each delay, and accumulated with the value stored in accumulation means 50.

At the end of the 341 partial correlation operations, accumulation means 50 thus contains the total correlation values, or more exactly the multiples (9 times) of the total correlation values, of the 108 successive delays examined.

It is apparent from the foregoing that the correlation device according to the present invention thus has the advantage of allowing a correlation peak to be determined without this requiring significant hardware resources.

This device further allows a set of correlation values to be simultaneously determined for d×Nd successive delays of the reception signal, all these values being accumulated in the memory sections of the accumulation means. The user thus benefits from the availability of a set of values which not only allows detection of a correlation peak corresponding to the distance to a target, but may further allow analysis of the nature of the target's environment or detection of multiple echoes.

Moreover, the device according to the present invention has the important advantage of being substantially independent of length N of the coded reference sequence. Indeed, only the capacity of the accumulation means limits the length of the reference sequence, the size of the registers and the number of elements of the calculating means only being fixed by the number of relevant delays which one wishes to examine.

What is claimed is:

1. A digital correlation device allowing detection of the occurrence of a coded reference sequence including N code elements or chips in a sampled reception signal, this device including first and second registers for respectively loading successive samples of said reception signal and chips of said coded reference sequence, and calculating means coupled to said first and second registers to generate correlation values for a set of successive delays of said reception signal, wherein:

said reception signal is sampled at a frequency equal to d times the chip rate of said reference sequence;

said device is arranged to generate d×Nd correlation values corresponding to d×Nd successive delays of said reception signal, Nd being a lower number than the number N of chips of the reference sequence, each correlation value, for a given delay of the reception signal, being obtained at the end of a determined number of partial correlation operations during which said calculating means generate a partial correlation value covering code portions including Nd successive chips of the reference sequence;

said device further includes accumulation means, coupled to the calculating means, and including d×Nd memory sections each allowing the partial correlation value generated for a given delay of the reception signal to be accumulated during each partial correlation operation;

said device further includes pre-processing means arranged at the input of said first register and perfoming, at each sampling period, the sum of d successive samples of said reception signal, said sum forming a signal element which is loaded in said first register;

said first register includes d×Nd cells allowing d×Nd successive signal element of said reception signal to be loaded;

said second register includes Nd cells allowing a code portion including Nd successive chips of said reference sequence to be loaded; and said calculation means include an adder and Nd multipliers respectively coupled, on the one hand, to Nd cells of the first register selected from the first cell of said register with a periodicity of a signal elements and, on the other hand, to the Nd cells of the second register, the adder allowing the outputs of said multipliers to be summed and thereby a partial correlation value to be formed, this partial correlation value being intended to be accumulated in the corresponding memory selection of said accumulation means.

2. The digital correlation device according to claim 1, wherein said accumulation means is a RAM.

3. A digital correlation method allowing detection of the occurrence of a coded reference signal including N code elements or chips in a sampled reception signal, this method generating correlation values for a set of successive delays of said reception signal, wherein:

said reception signal is sampled at a frequency equal to d times the chip rate of said reference sequence; and d×Nd correlation values are generated for d×Nd successive delays of said reception signal, Nd being a lower number than the number N of chips of the reference sequence;

this method including the steps of:

a) selecting a code portion covering the Nd first successive chips of the reference sequence;

b) selecting a set of samples of the reception signal corresponding to the first delay;

c) calculating a partial correlation value between the selected code portion and the selected samples of the reception signal;

d) accumulating the calculated partial correlation value;

e) selecting a set of samples of the reception signal corresponding to the next delay;

f) repeating steps c) to e) until a partial correlation value has been calculated and accumulated for the d×Nd delays of the reception signal;

g) selecting a code portion covering Nd successive chips of the reference sequence directly following the previously selected code portion; and h) repeating steps b) to g) until the selected code portion covers the Nd last successive chips of the reference sequence;

wherein said steps b), e) of selecting a set of samples of the reception signal include:

i. pre-processing said samples of the reception signal by performing, at each sampling period, the sum of d successive samples of the reception signal, said sum forming a signal element which is loaded in a first register including d×Nd cells; and ii. loading d×Nd successive signal elements in said first register; and wherein said steps a), g) of selecting a code portion include loading Nd successive chips of the reference sequence in a second register including Nd cells;

and wherein said step c) of calculating a partial correlation value includes:

i. performing Nd multiplication operations each consisting in multiplying one signal element loaded in said first register, selected from the first cell of the register with a periodicity of d signal elements, with one chip loaded in said second register; and ii. adding the result of said Nd multiplication operation.

4. A digital correlation device allowing detection of the occurrence of a coded reference sequence including N code elements or chips in a sampled reception signal, this device including first and second registers for respectively loading successive samples of said reception signal and chips of said coded reference sequence, and calculating means coupled to said first and second registers to generate correlation values for a set of successive delays of said reception signal, wherein:

said reception signal is sampled at a frequency equal to d times the chip rate of said reference sequence;

said device is arranged to generate d×Nd correlation values corresponding to d×Nd successive delays of said reception signal, Nd being a lower number than the number N of chips of the reference sequence, each correlation value, for a given delay of the reception signal, being obtained at the end of a determined number of partial correlation operations during which said calculating means generate a partial correlation value covering code portions including Nd successive chips of the reference sequence;

said device further includes accumulation means, coupled to the calculating means, and including d×Nd memory sections each allowing the partial correlation value generated for a given delay of the reception signal to be accumulated during each partial correlation operation;

said first register includes d×Nd cells allowing d×Nd successive samples of said reception signal to be loaded;

said second register includes d×Nd cells allowing a code portion including Nd successive chips of said reference sequence to be loaded, each of the chips being repeated in d successive cells of said second register; and said calculating means include an adder and d×Nd multipliers respectively coupled, on the one hand, to the d×Nd cells of the first register, and, on the other hand, to the d×Nd cells of the second register, the adder allowing the outputs of said multipliers to be summed and thereby a partial correlation value to be formed, this partial correlation value being intended to be accumulated in the corresponding memory section of said accumulation means.

5. The digital correlation device according to claim 4, wherein said accumulation means is a RAM.

6. A digital correlation method allowing detection of the occurrence of a coded reference signal including N code elements or chips in a sampled reception signal, this method generating correlation values for a set of successive delays of said reception signal, wherein:

said reception signal is sampled at a frequency equal to d times the chip rate of said reference sequence; and d×Nd correlation values are generated for d×Nd successive delays of said reception signal, Nd being a lower number than the number N of chips of the reference sequence;

this method including the steps of:
a) selecting a code portion covering the Nd first successive chips of the reference sequence;
b) selecting a set of samples of the reception signal corresponding to the first delay;
c) calculating a partial correlation value between the selected code portion and the selected samples of the reception signal;
d) accumulating the calculated partial correlation value;
e) selecting a set of samples of the reception signal corresponding to the next delay;
f) repeating steps c) to e) until a partial correlation value has been calculated and accumulated for the d×Nd delays of the reception signal;
g) selecting a code portion covering Nd successive chips of the reference sequence directly following the previously selected code portion; and
h) repeating steps b) to g) until the selected code portion covers the Nd last successive chips of the reference sequence;

wherein said steps b), e) of selecting a set of samples of the reception signal include loading d×Nd successive samples of the reception signal in a first register including d×Nd cells;

wherein said steps a), g) of selecting a code portion include loading Nd successive chips of the reference sequence in a second register including d×Nd cells, each of the chips being repeated in d successive cells of the second register; and wherein said step c) of calculating a partial correlation value includes:
i. performing d×Nd multiplication operations each consisting in multiplying one sample loaded in said first register with one chip loaded in said second register; and
ii. adding the result of said d×Nd multiplication operations.

* * * * *